United States Patent [19]

Iwagami et al.

[11] Patent Number: 4,533,927

[45] Date of Patent: Aug. 6, 1985

[54] CAPPING MECHANISM FOR PREVENTING NOZZLE BLOCKING IN AN INK JET SYSTEM PRINTER

[75] Inventors: Fusao Iwagami, Nara; Hisashi Yoshimura, Soraku, both of Japan

[73] Assignee: Sharp Kabushiki Kaisha, Osaka, Japan

[21] Appl. No.: 491,666

[22] Filed: May 5, 1983

[30] Foreign Application Priority Data

May 6, 1982 [JP] Japan .................. 57-76143
May 6, 1982 [JP] Japan .................. 57-76144

[51] Int. Cl.³ .................. G01D 15/18
[52] U.S. Cl. .................. 346/140 R
[58] Field of Search .................. 346/140 R

[56] References Cited

U.S. PATENT DOCUMENTS

| | | | |
|---|---|---|---|
| 4,045,802 | 8/1977 | Fukazawa | 346/140 |
| 4,144,537 | 3/1979 | Kimura | 346/140 |
| 4,228,442 | 10/1980 | Krull | 346/140 |
| 4,410,900 | 10/1983 | Terasawa | 346/140 |

*Primary Examiner*—Joseph W. Hartary
*Attorney, Agent, or Firm*—Birch, Stewart, Kolasch & Birch

[57] ABSTRACT

An ink jet system printer includes a capping mechanism for covering a printer head when a carriage is located at a stand-by position. The capping mechanism includes a cap member supported by a slidable plate. The slidable plate is shifted toward the printer head as the printer head moves to the stand-by position through the use of links, whereby the cap member covers the nozzle portion included in the printer head. That is, the slidable plate is shifted by the travelling force of the carriage and, therefore, a separate drive source is not required for the slidable plate.

3 Claims, 7 Drawing Figures

CAPPING MECHANISM FOR PREVENTING NOZZLE BLOCKING IN AN INK JET SYSTEM PRINTER

BACKGROUND AND SUMMARY OF THE INVENTION

The present invention relates to a unit for preventing nozzle blockage in an ink jet system printer and, more particularly, to a capping mechanism for covering a nozzle unit in an ink jet system printer of the ink-on-demand type.

An ink jet system printer of the ink-on-demand type includes an orifice which is exposed to ambient conditions via a nozzle slit. When the ink jet system printer is placed in the non-operating condition for a long period, there is a possibility that the ink liquid present in the nozzle slit will solidify and block the orifice.

To prevent the above-mentioned blocking of the orifice, a capping mechanism has been proposed to cover the nozzle slit while the ink jet system printer is placed in a non-operating condition. However, the conventional capping mechanism includes a solenoid which makes the system complicated and large.

Accordingly, an object of the present invention is to provide a simplified capping mechanism for covering a nozzle orifice in an ink jet system printer when the ink jet system printer is placed in a non-operating condition.

Another object of the present invention is to provide a system for preventing nozzle blockage in an ink jet system printer of the ink-on-demand type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a cap shift mechanism is provided for shifting a cap toward a printer head when the printer head is located in a stand-by position, thereby covering the nozzle slit with the cap when the ink jet system printer is placed in a non-operating condition. The cap shift mechanism does not include an energized drive system. The cap shift mechanism is correlated with the movement of the printer head so that the cap is automatically shifted when the printer head is moved to the stand-by position.

In a preferred form, a first spring means is provided for smoothly shifting the cap toward the printer head when the printer head is located in the stand-by position. A second spring means is provided for tightly depressing the cap against the printer head when the printer head is located in the stand-by position such that the actual printing operation is not conducted.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
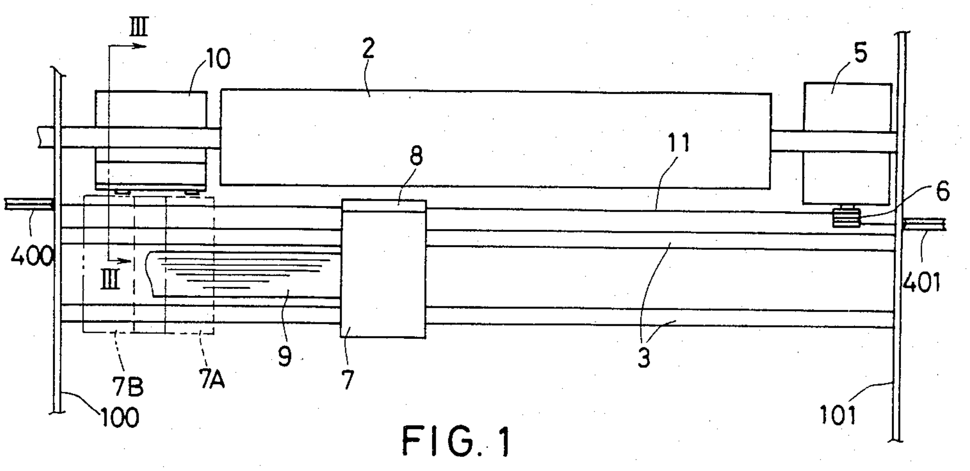
FIG. 1 is a plan view of an essential part of an ink jet system printer which includes an embodiment of the nozzle capping mechanism of the present invention.
Figure 2:
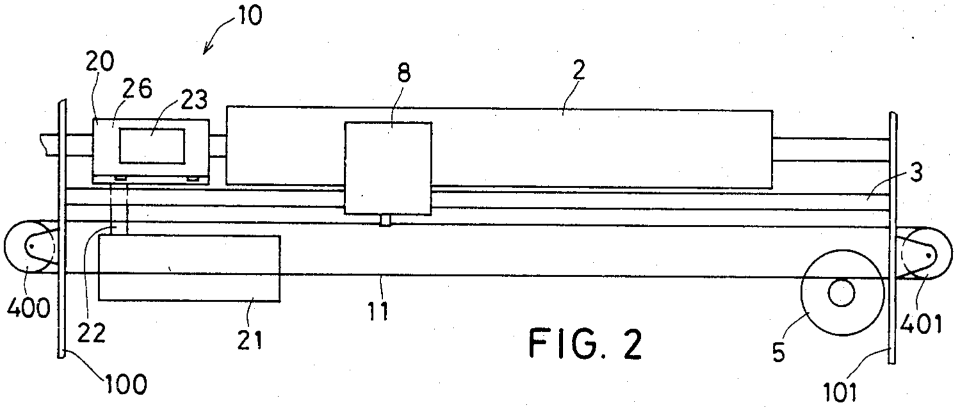
FIG. 2 is a front view of the ink jet system printer of FIG. 1.
Figure 3:
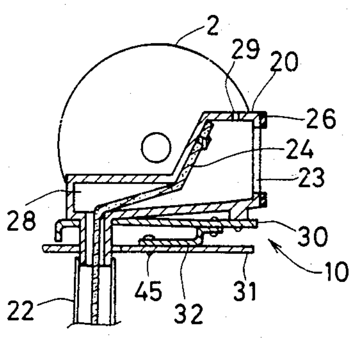
FIG. 3 is a sectional view of the nozzle capping mechanism taken along line III—III of FIG. 1.

An ink jet system printer generally includes a platen 2 which is rotatably supported by opposing frames 100 and 101. A drive system (not shown) is connected to the platen 2 so as to feed a record receiving paper at a desired time. A pair of shafts 3 are disposed between the frames 100 and 101 along the platen 2. A carriage 7 is slidably mounted on the pair of shafts 3. The carriage 7 is connected to a motor 5 via a wire 11 which is extended between a drum 6 and pulleys 400 and 401. That is, the carriage 7 is driven by the motor 5 to travel along the pair of shafts 3. More specifically, in the actual printing operation, the carriage 7 is driven to reciprocate between a home position 7A and a right margin. Furthermore, the carriage 7 is shifted to a stand-by position 7B when the ink jet system printer is placed in a non-operating condition.

A printer head 8 is mounted on the carriage 7 so as to confront the platen 2. The printer head 8 includes a plurality of orifices and associated nozzle slits for emitting ink droplets toward the record receiving paper which is supported by the platen 2. The print information signal is applied from a print control system (not shown) to the carriage 7 (printer head 8) via a cable 9. When the print information signal is not applied to the carriage 7 for more than a predetermined period of time, the carriage 7 is driven to shift to the stand-by position 7B and, then, the main power supply is terminated.

A capping mechanism 10 of the present invention is to cover the nozzle slits when the carriage 7 is located at the stand-by position 7B. The capping mechanism 10 includes a cap member 20 mounted on a slidable plate 30. The cap member 20 is connected to a reservoir 21, which contains a solvent such as water, via a flexible conduit 22. The slidable plate 30 is rotatably mounted on a stationary table 31 through the use of a link 32.

The cap member 20 includes a vapor chamber 28 having an aperture 23 formed at the front end thereof. A damping rubber 26 is secured around the aperture 23 so that the cap member 20 tightly contacts the printer head 8 with the intervention of the damping rubber 26. A liquid absorption sheet 24 is disposed in the vapor chamber 28 in a manner that the liquid absorptive sheet 24 is inclined with respect to the front end of the vapor chamber 28. The liquid absorption sheet 24 is extended to the reservoir 21 through the flexible conduit 22. Therefore, the solvent vapor is filled in the vapor chamber 28 due to the capillary action. An opening 29 is formed in the ceiling wall of the vapor chamber 28 in order to prevent the introduction of air into the orifice when the printer head is covered by the cap member 20. Furthermore, in order to remove air from the orifice, the ink droplets are emitted from the nozzle under the condition where the printer head is covered by the cap member 20. The thus emitted ink droplets are directed to the liquid absorption sheet 24 and collected in the reservoir 21 via the flexible conduit 22.

Figure 4:
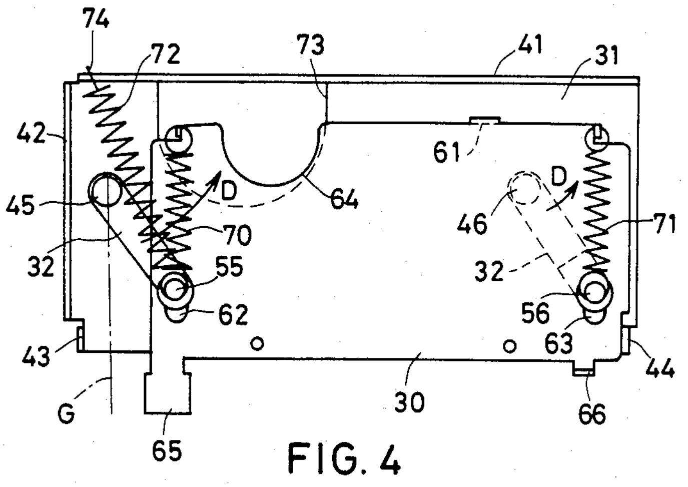
FIG. 4 is a plan view of a slidable plate included in the nozzle capping mechanism.
Figure 5:
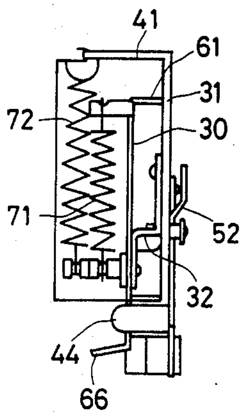
FIG. 5 is a side view of the slidable plate of FIG. 4.

The slidable plate 30 is shown in FIGS. 4 and 5. The slidable plate 30 includes a cap set projection 65 and a cap reset projection 66 which are projected to the passage of the carriage 7. The cap set projection 65 and the cap reset projection 66 are separated from each other by a distance longer than the width of the carriage 7. An indent 64 is formed at the rear end of the slidable plate 30, through which the flexible conduit 22 is disposed. A guide angle 61 is provided at the rear end of the slidable plate 30, which contacts the surface of the stationary table 31. Elliptic openings 62 and 63 are formed in the slidable plate 30 along the side edges of the slidable plate 30, the elliptic openings 62 and 63 accomodating pins 55 and 56 which are provided at the tip ends of the links 32, respectively. The pins 55 and 56 are depressed by springs 70 and 71, respectively, so that the slidable plate 30 is depressed toward the passage of the carriage 7.

The links 32 are rotatably supported by shafts 45 and 46 which are disposed on the stationary table 31. The shafts 45 and 46 have the same height as the guide angle 61, and the pins 55 and 56 are rotatably engaged in the elliptic openings 62 and 63. A spring 72 is disposed between the pin 55 and a side wall 41 of the stationary table 31 so that the slidable plate 30 is pulled backward. That is, the moment in the direction shown by an arrow D is applied by the spring 72 to the link 32, whereby the slidable plate 30 stationary contacts a stopper 44 provided on the stationary table 31 (see FIG. 4). Even when an inadvertent force is applied to the cap member 20 while the slidable plate 30 is held in the stationary state, the cap member 20 is returned to the stationary position by means of the spring 72. When the carriage 7 is located at the stand-by position 7B, the cap member 20 covers the printer head 8 as already discussed above. At this moment, the link 32 is located on a chain line G, wherein the slidable plate 30 contacts a stopper 43 formed on the stationary table 31 and held stationary by means of the spring 72.

Figure 6:
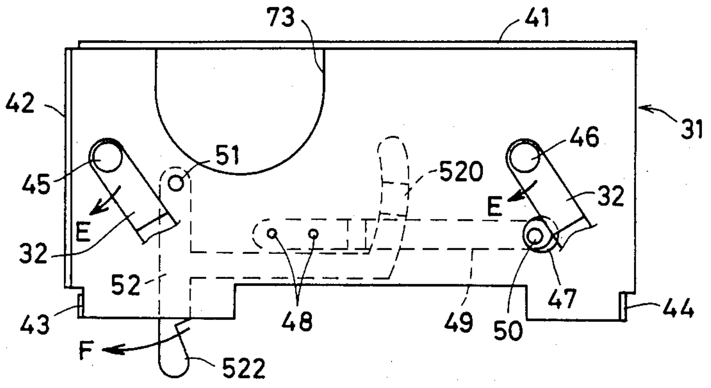
FIG. 6 is a plan view of a stationary table included in the nozzle capping mechanism.

The stationary table 31 is shown in FIG. 6. Side walls 41 and 42 of the stationary table 31 are secured to the body of the ink jet system printer so that the slidable plate 30 supported by the stationary table 31 is disposed along the passage of the carriage 7. An aperture 73 is formed in the stationary table 31, through which the flexible conduit 22 is disposed. A locking leaf spring 49 is secured to the bottom surface of the stationary table 31 through the use of pins 48 in a manner that the leaf spring 49 is parallel to the side wall 41. A locking pin 50 is provided at the tip end of the leaf spring 49. The locking pin 50 protrudes through an aperture 47 formed in the stationary table 31. The link 32 contacts the locking pin 50 to limit the rotation of the link 32 in the direction shown by an arrow E. This will preclude the cap member 20 from being inadvertently pushed to the passage of the carriage 7. A lock release lever 52 is rotatably secured to the bottom surface of the stationary table 31 by means of a shaft 51. At the tip end of the lock release lever 52, a cam projection 520 is formed. The lock release lever 52 is inserted between the leaf spring 49 and the stationary table 31. The lock release lever 52 has a projection 522 which is projected to the passage of the carriage 7. When a force is applied to the projection 522 in the direction shown by an arrow F, the lock release lever 52 rotates around the shaft 51 so that the cam projection 520 depresses the leaf spring 49 downward to remove the locking pin 50 from the aperture 47.

The above-mentioned slidable plate 30 and the cap set projection 65 form, in combination, a cap drive means which shifts in the travelling direction of the carriage 7 as the carriage 7 moves to the stand-by position 7B. The slidable plate 30, the cap set projection 65 and the links 32 form, in combination, a cap shifting means which pushes the cap member 20 toward the printer head 8 as the carriage 7 moves toward the stand-by position 7B. The springs 70 and 71 form, in combination, a first depression means for depressing the cap member 20 to the printer head 8. The spring 72 functions as a second spring means for holding the cap member 20 at a position at which the cap member 20 tightly covers the printer head 8.

Figure 7:
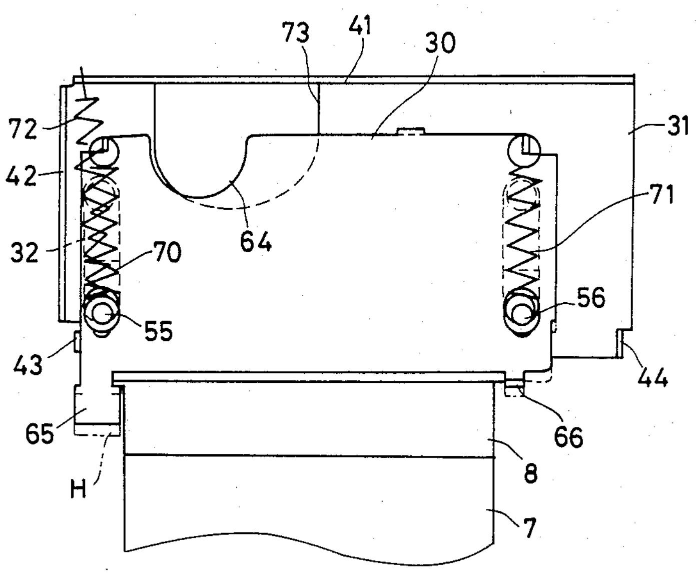
FIG. 7 is a plan view showing an operational mode of an embodiment of the nozzle capping mechanism of the present invention.

When the main power supply is interrupted, or when the print information signal is not applied to the ink jet system printer for more than a predetermined period of time, the carriage 7 is driven to travel toward the standby position 7B. The left edge of the carriage 7 depresses the cap set projection 65 and the projection 522 of the lock release lever 52 leftward. Accordingly, the slidable plate 30 is depressed leftward to rotate the links 32 around the shafts 45 and 46, respectively, in the direction shown by the arrow E. At the same time, the lock release lever 52 is rotated in the direction shown by the arrow F so that the locking pin 50 is escaped from the locking condition. Accordingly, the slidable plate 30 is pushed forward by means of the rotation of the links 32 till the left edge of the slidable plate 30 contacts the stopper 43. FIG. 7 shows a condition where the slidable plate 30 is located at the capping position. The slidable plate 30 is pushed forward by means of the springs 70 and 71, and located as shown by a phantom line H. The carriage 7 is held stationary between the projections 65 and 66. Under these conditions, the cap member 20 mounted on the slidable plate 30 tightly covers the printer head 8 by means of the depression force created by the springs 70 and 71. The orifice portion of the printer head 8 contacts the vapor filled in the vapor chamber 28, thereby preventing the blocking of the orifice portion. Even when an inadvertent force is applied to the carriage 7 or the cap member 20, the cap member 20 is returned to the capping position by means of the spring 72.

When the print start command is developed, the carriage 7 is driven to shift to the home position 7A. By this movement, the right edge of the carriage 7 depresses the cap reset projection 66 to rotate the links 32 in the direction shown by the arrow D in FIG. 4. Thus, the slidable plate 30 is returned to a position where the cap member 20 is separated from the printer head 8. The leaf spring 49 depresses the locking pin 50 so that the locking pin 50 is placed in the locking position through the aperture 47. The un-capping state is maintained by the spring 72 and locked by the locking pin 50 so that the slidable plate 30 is never placed at a position where the slidable plate 30 disturbs the movement of the carriage 7.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A nozzle capping mechanism in an ink jet system printer containing a printer head mounted on a carriage for covering nozzle slits in said printer head when said carriage is located in a stand-by position when said printer is placed in a non-operating condition comprising:

a cap member for capping said printer head, and a slidable plate means for supporting said cap member, said slidable plate being rotatably mounted on a stationary table via a link means, said slidable plate including a cap set projection and a cap reset projection which projects into a passage of said carriage and are separated from each other by a distance longer than a width of said carriage; said slidable plate being disposed along said passage of said carriage, said slidable plate and cap set projection forming, in combination, a cap drive means for shifting said cap member into said stand-by position of said carriage and said slidable plate, cap set projection and link means forming, in combination, a cap shifting means which pushes said cap member toward said printer head when said carriage is placed in said stand-by position.

2. The nozzle capping mechanism of claim 1, wherein said cap shifting means includes first depression means for depressing said cap member to said printer head and second depression means for holding said cap member in a stationary position.

3. The nozzle capping mechanism of claim 1, wherein said cap member includes a vapor chamber having disposed therein a liquid absorption sheet connected to a reservoir via a flexible conduit, such that ink droplets emitted from said nozzle are directed to said liquid absorption sheet and collected in said reservoir via said flexible conduit.

* * * * *